United States Patent
Lin et al.

(10) Patent No.: US 7,865,035 B2
(45) Date of Patent: Jan. 4, 2011

(54) VIDEO QUALITY ADAPTIVE CODING ARTIFACT REDUCTION

(75) Inventors: Peng Lin, Pleasanton, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1490 days.

(21) Appl. No.: 11/246,634

(22) Filed: Oct. 6, 2005

(65) Prior Publication Data

US 2007/0081596 A1    Apr. 12, 2007

(51) Int. Cl.
- *G06K 9/40* (2006.01)
- *G06K 9/00* (2006.01)
- *H04N 7/12* (2006.01)
- *H04N 11/02* (2006.01)
- *H04N 11/04* (2006.01)

(52) U.S. Cl. .............. 382/275; 382/252; 382/261; 375/240.27; 375/240.29

(58) Field of Classification Search ............ 375/240.27, 375/240.29; 382/275, 252, 261
See application file for complete search history.

(56) References Cited

U.S. PATENT DOCUMENTS

| | | | |
|---|---|---|---|
| 5,574,699 A | 11/1996 | Cuomo | |
| 5,610,729 A | 3/1997 | Nakajima | |
| 5,852,475 A | 12/1998 | Gupta et al. | |
| 5,920,356 A | 7/1999 | Gupta | |
| 6,188,799 B1 | 2/2001 | Tan | |
| 6,192,161 B1 * | 2/2001 | Kondo et al. | 382/261 |
| 6,577,764 B2 * | 6/2003 | Myler et al. | 382/228 |
| 6,898,328 B2 * | 5/2005 | Carrig et al. | 382/261 |
| 6,904,096 B2 * | 6/2005 | Kobayashi et al. | 375/240.26 |
| 6,934,057 B1 | 8/2005 | Namizuka | |
| 7,076,113 B2 | 7/2006 | Le Dinh | |
| 7,136,538 B2 | 11/2006 | Kitagawa | |
| 7,155,067 B2 | 12/2006 | Jayant et al. | |
| 7,551,772 B2 | 6/2009 | Lim et al. | |
| 2008/0085059 A1 | 4/2008 | Chao et al. | |

(Continued)

FOREIGN PATENT DOCUMENTS

WO    WO 02/102086    12/2002

OTHER PUBLICATIONS

U.S. Appl. No. 11/121,819, filed May 2, 2005, P. Lin et al.

(Continued)

*Primary Examiner*—John B Strege
(74) *Attorney, Agent, or Firm*—Kenneth L. Sherman, Esq.; Michael Zarrabian, Esq.; Myers Andras Sherman & Zarrabian LLP

(57) ABSTRACT

A video quality adaptive coding artifact reduction system has a video quality analyzer, an artifact reducer, and a filter strength controller. The video quality analyzer employs input video quality analysis to control artifact reduction. The video quality analyzer accesses the video quality of the decoded video sequence to estimate the input video quality. The filter strength controller globally controls the filter strength of the artifact reducer based on the video quality estimate by the video quality analyzer. For low quality input video, the filter strength controller increases the artifact reduction filter strength to more efficiently reduce the artifact. For high quality input video, the filter strength controller decreases the artifact reduction filter strength to avoid blurring image detail.

29 Claims, 4 Drawing Sheets

U.S. PATENT DOCUMENTS

2008/0152253 A1    6/2008    Thompson

OTHER PUBLICATIONS

U.S. Non-final Office Action for U.S. Appl. No. 11/121,819 mailed on Sep. 23, 2008.

U.S. Non-final Office Action for U.S. Appl. No. 11/121,819 mailed on Mar. 17, 2009.

U.S. Notice of Allowance for U.S. Appl. No. 11/121,819 mailed on Sep. 17, 2009.

* cited by examiner

VIDEO QUALITY ADAPTIVE CODING ARTIFACT REDUCTION

FIELD OF THE INVENTION

The present invention relates generally to video post processing, and more particularly to coding artifact reduction in decoded video sequences.

BACKGROUND OF THE INVENTION

Many popular video compression standards, such as MPEG-1, MPEG-2 and H.263, are based on Discrete Cosine Transform (DCT). The basic approach of the DCT-based video compression technique is to subdivide the video image into non-overlapping blocks and then individually transform, quantize, and encode each block. However, using DCT-based compression techniques some artifacts may occur, especially at low and moderate bit rates. Two most noticeable artifacts are mosquito noise (or ringing artifact) and blocking artifact. Mosquito noise mostly appears in image homogeneous regions near strong edges. It is caused by loss of high frequency transform coefficients during quantization. Blocking artifacts appear as artificial discontinuities between the boundaries of the blocks. It is caused by independent processing of the individual blocks.

Many techniques have been proposed for removing mosquito noise and blocking artifacts. The basic steps for mosquito noise reduction usually include mosquito noise region detection and region adaptive filtering. The basic steps for blocking artifact reduction are to apply a low-pass filter across the block boundaries to smooth out the discontinuity. While various coding artifact reduction techniques have shown their effectiveness in different situations, a common shortcoming of such techniques is that they rarely consider the video quality of the input video. Therefore, such techniques treat the high quality video and the low quality video the same way, which unavoidably leads to over-smoothing of relatively high quality video, and insufficient artifact reduction for relatively low quality video.

BRIEF SUMMARY OF THE INVENTION

The present invention addresses the above shortcoming. An object of the present invention is to provide a video quality adaptive coding artifact reduction method and system that employs input video quality analysis to control artifact reduction. According to an embodiment of the present invention, a video quality adaptive coding artifact reduction system includes a video quality analyzer, an artifact reducer, and a filter strength controller.

The video quality analyzer accesses the video quality of the decoded video sequence. The video quality analyzer can either use the decoded video sequence or other coding parameters, or both, to provide an estimate of the input video quality. In one embodiment, the video quality analyzer unit first computes the frame average quantizer scale to obtain a frame image quality estimate. The quantizer scale is a well-known parameter in video compression relating to the degree of compression such as in the MPEG-2 video compression. Then, the frame image quality estimate is properly weighted based on the frame type. Finally, the properly weighted frame image quality estimates of the neighboring frames centered at the current frame are averaged to obtain a temporal consistent video quality estimate for the current frame. As known to those skilled in the art, there can be many other different ways of analyzing the video quality of a compressed video by investigating quantization scales. The present invention is not limited to particular ways of obtaining such information. The present invention provides a method of adaptively adjusting the strength of coding artifact reduction filters with the video quality analyzer or the degree of compression of a video.

The artifact reducer comprises a coding artifact reduction filter that removes certain types of coding artifacts. In one embodiment, the artifact reducer comprises a mosquito noise reduction filter including a ringing area detector, a local noise power estimator, a smoothing filter, and a mixer. The ringing area detector includes an edge detector, a near edge detector, a texture detector, and a filtering region decision block. The ringing area detector detects the ringing area where the smoothing filter is to be applied. The local noise power estimator estimates the local noise power and locally controls the filter strength of the smoothing filter. The smoothing filter smoothes the input image. The mixer mixes the smoothed image and the original image properly based on the region information from the ringing area detector.

The filter strength controller of the video quality adaptive coding artifact reduction system globally controls the filter strength of the artifact reduction filter based on the assessment of the video quality by the video quality analyzer. For low quality input video, the filter strength controller increases the artifact reduction filter strength to more efficiently reduce the artifact. For high quality input video, the filter strength controller decreases the artifact reduction filter strength to avoid blurring image detail. In one embodiment, the filter strength controller globally controls the filter strength of the artifact reduction filter by globally readjusting the estimated local noise power.

Other features and advantages of the present invention will be apparent from the following specifications taken in conjunction with the following drawings.

DETAILED DESCRIPTION OF THE INVENTION

Figure 1:
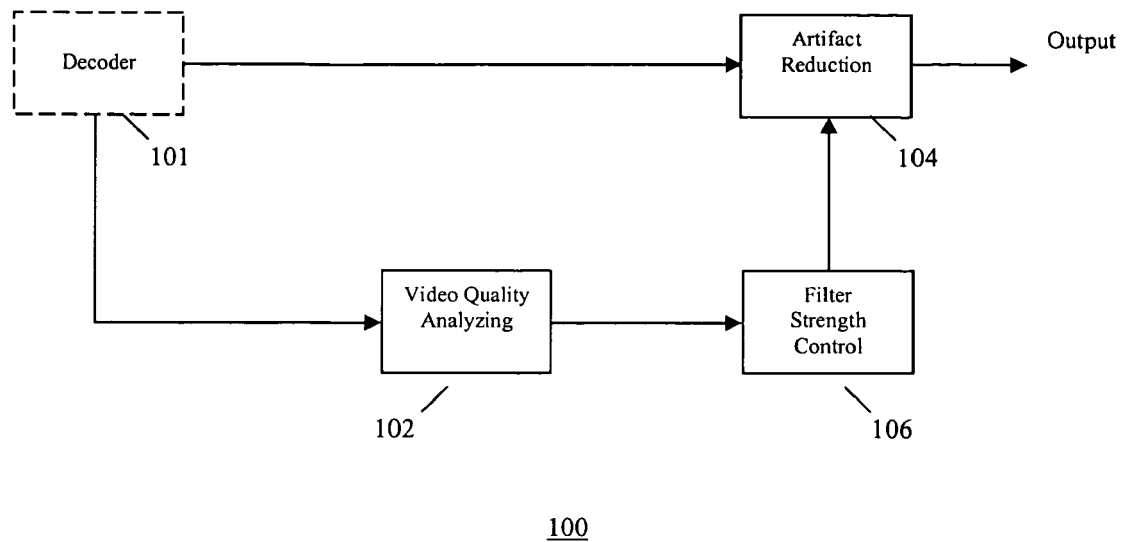
FIG. 1 shows a block diagram of a video quality adaptive coding artifact reduction system according to an embodiment of the present invention.

Referring to the drawings, the present invention provides a video quality adaptive coding artifact reduction method and system that implements input video quality analysis to control artifact reduction. Referring to FIG. 1, according to an embodiment of the present invention, a video quality adaptive coding artifact reduction system 100 includes a video quality analyzer 102, an artifact reducer 104, and a filter strength controller 106. The system 100 can optionally include a decoder 101 for decoding encoded input video sequence.

The video quality analyzer 102 accesses the video quality of the decoded video sequence. The video quality analyzer 102 can either use the decoded video sequence or other coding parameters, or both, to provide an estimate of the input video quality. In one embodiment, the video quality analyzer 102 first computes the frame average quantizer scale to obtain a frame image quality estimate. Then, the frame image quality estimate is properly weighted based on the frame type.

The frame type I, P, B types in the MPEG-2 video compression depending on what kind of motion estimation/compensation is used. An I frame picture does not use motion estimation or compensation for compression, a P frame picture uses forward motion estimation/compensation, and, a B frame picture uses forward and backward motion estimation/compensation.

Finally, the properly weighted frame image quality estimates of the neighboring frames centered at the current frame are averaged to obtain a temporal consistent video quality estimate for the current frame.

The artifact reducer 104 comprises a coding artifact reduction filter that removes certain types of coding artifacts. As described in more detail further below in relation to FIG. 3, in one embodiment, the artifact reducer 104 comprises a mosquito noise reduction filter including a ringing area detector, a local noise power estimator, a smoothing filter, and a mixer. The ringing area detector includes an edge detector, a near edge detector, a texture detector, and a filtering region decision block. The ringing area detector detects the ringing area where the smoothing filter is to be applied. The local noise power estimator estimates the local noise power and locally controls the filter strength of the smoothing filter. The smoothing filter smoothes the input image. The mixer mixes the smoothed image and the original image properly based on the region information from the ringing area detector.

In FIG. 1, the filter strength controller 106 globally controls the filter strength of the artifact reduction filter of the artifact reducer 104, based on the assessment of the video quality by the video quality analyzer 102. For low quality input video, the filter strength controller 106 increases the artifact reduction filter strength to more efficiently reduce the artifact. For high quality input video, the filter strength controller 106 decreases the artifact reduction filter strength to avoid blurring image detail.

In one embodiment, the filter strength controller 106 globally controls the filter strength of the artifact reduction filter by globally readjusting the estimated local noise power.

As such, the video quality analyzer 102 first estimates the video quality of the decoded video sequence. Based on the estimated video quality, the filter strength controller 106 adjusts the filter strength of the artifact reducer 104. If the quality of the input video is low, the filter strength controller 106 increases the artifact reduction filter strength to more efficiently reduce the artifact. If the quality of the input video is relatively high, the filter strength controller 106 decreases the artifact reduction filter strength to avoid blurring image detail.

In the system 100 of FIG. 1, the video quality analyzer 102 accesses parameters relating to the video quality of the decoded video sequence to estimate the video quality. In one embodiment of accessing the parameters relating to the video quality, the video quality analyzer 102 obtains the quantizer scales and frame type information from the decoder 101 as input and computes certain statistics as an indicator of the video quality level. A macroblock is defined herein as a basic block unit in video compression such as MPEG-2 (e.g., an 8×8 block). In MPEG-2 video compression, a macroblock quantizer quantizes discrete cosine transform (DCT) coefficients for compression purposes.

First, the video quality analyzer 102 computes the frame average of all macroblocks' quantizer scales in a frame to obtain a frame average Q-value $Q_{F_k}$ as:

$$Q_{F_k} = \frac{1}{M \times N} \sum_{\beta=0}^{N-1} \sum_{\alpha=0}^{M-1} q_{\alpha\beta},$$

wherein, $Q_{F_k}$ is the frame average Q-value of frame $F_k$, $q_{\alpha\beta}$ is the quantizer scale of the macroblock at block position $(\alpha,\beta)$, and M×N is the total number of macroblocks in a frame. A large Q-value results in more compression, while a small Q-value results in less compression.

Then, the video quality analyzer 102 applies proper weights to the frame average Q-value $Q_{F_k}$ based on the frame type to obtain the weighted frame average Q-value, as:

$$\tilde{Q}_{F_k} = \begin{cases} w_I Q_{F_k} & \text{for } I\text{-frame,} \\ w_P Q_{F_k} & \text{for } P\text{-frame,} \\ w_B Q_{F_k} & \text{for } B\text{-frame,} \end{cases}$$

wherein, $\tilde{Q}_{F_k}$ is the weighted frame average Q-value, and $w_I$, $w_P$, $w_B$ are the weights for I-frame, P-frame, and B-frame, respectively. In a preferred embodiment, $w_I=1.5$, $w_P=1.5$, and $w_B=1.0$. However, as those skilled in the art recognize, this can be adjusted depending on application.

Then, the video quality analyzer 102 applies low pass filtering to the weighted frame average Q-value $\tilde{Q}_{F_k}$ to obtain a temporal average Q-value $\tilde{Q}_{T_k}$. In a preferred embodiment, the low-pass filtering is performed using a 7-tap average filter implementing the following relation:

$$\tilde{Q}_{T_k} = (\tilde{Q}_{F_{k-3}} + \tilde{Q}_{F_{k-2}} + \tilde{Q}_{F_{k-1}} + \tilde{Q}_{F_k} + \tilde{Q}_{F_{k+1}} + \tilde{Q}_{F_{k+2}} + \tilde{Q}_{F_{k+3}})/7.$$

However, as those skilled in the art recognize, this can be adjusted depending on applications.

Finally, the video quality analyzer 102 computes the video quality Q-value at frame k, denoted by $Q_k$, as the reciprocal of the temporal average Q-value $\tilde{Q}_{T_k}$, as:

$$Q_k = 1/\tilde{Q}_{T_k}.$$

In this example, the range of the video quality Q-value $Q_k$ is between 0 and 1 (other ranges are possible). A smaller $Q_k$ value indicates low quality video, and a larger $Q_k$ value indicates high quality video. Note that there can be other ways of making $Q_k$ as a function of $\tilde{Q}_{T_k}$. The one shown above is one example embodiment.

Figure 2:
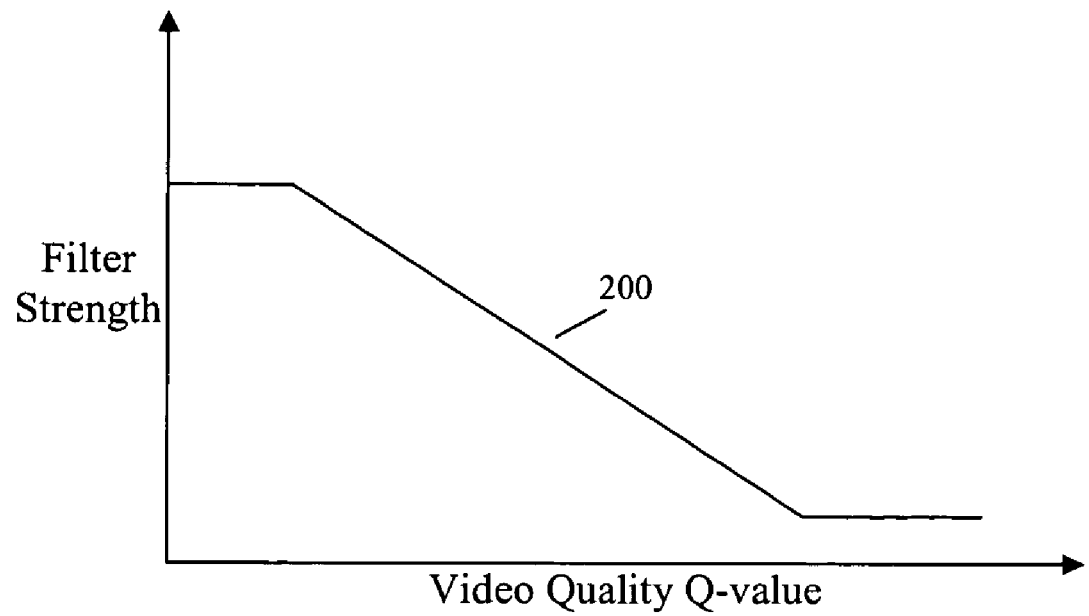
FIG. 2 shows a diagram of an example non-increasing function used by the filter strength controller in FIG. 1, which maps the video quality value to the filter strength value.

Referring to FIG. 1, based on the estimated video quality Q-value $Q_k$, the filter strength controller 106 adjusts the filter strength of the artifact reduction filter of the artifact reducer 104. Generally speaking, the filter strength controller implements a non-increasing function, as shown by the example graph 200 in FIG. 2, which maps the video quality Q-value to the filter strength value of the artifact reducer 104. Low video quality Q-value is mapped into high filter strength value, and high video quality Q-value is mapped into low filter strength value.

Referring back to FIG. 1, as noted, the artifact reducer 104 includes a coding artifact reduction filter that removes certain types of coding artifacts. Examples of the coding artifact reduction filter include a deblocking filter, a deringing filter, and/or a mosquito noise reduction filter. For blocking artifact and ringing artifact of coding artifact reduction filters, a global parameter is used to adjust the global filter strength.

Usually a coding artifact reduction filter includes a user controlled global filter strength parameter. According to an embodiment of the present invention, the global filter strength parameter of the artifact reduction filter in the artifact reducer 104 of the system 100 is dynamically controlled by the filter strength controller 106 based on the video quality estimate obtained by the video quality analyzer 102.

Figure 3:
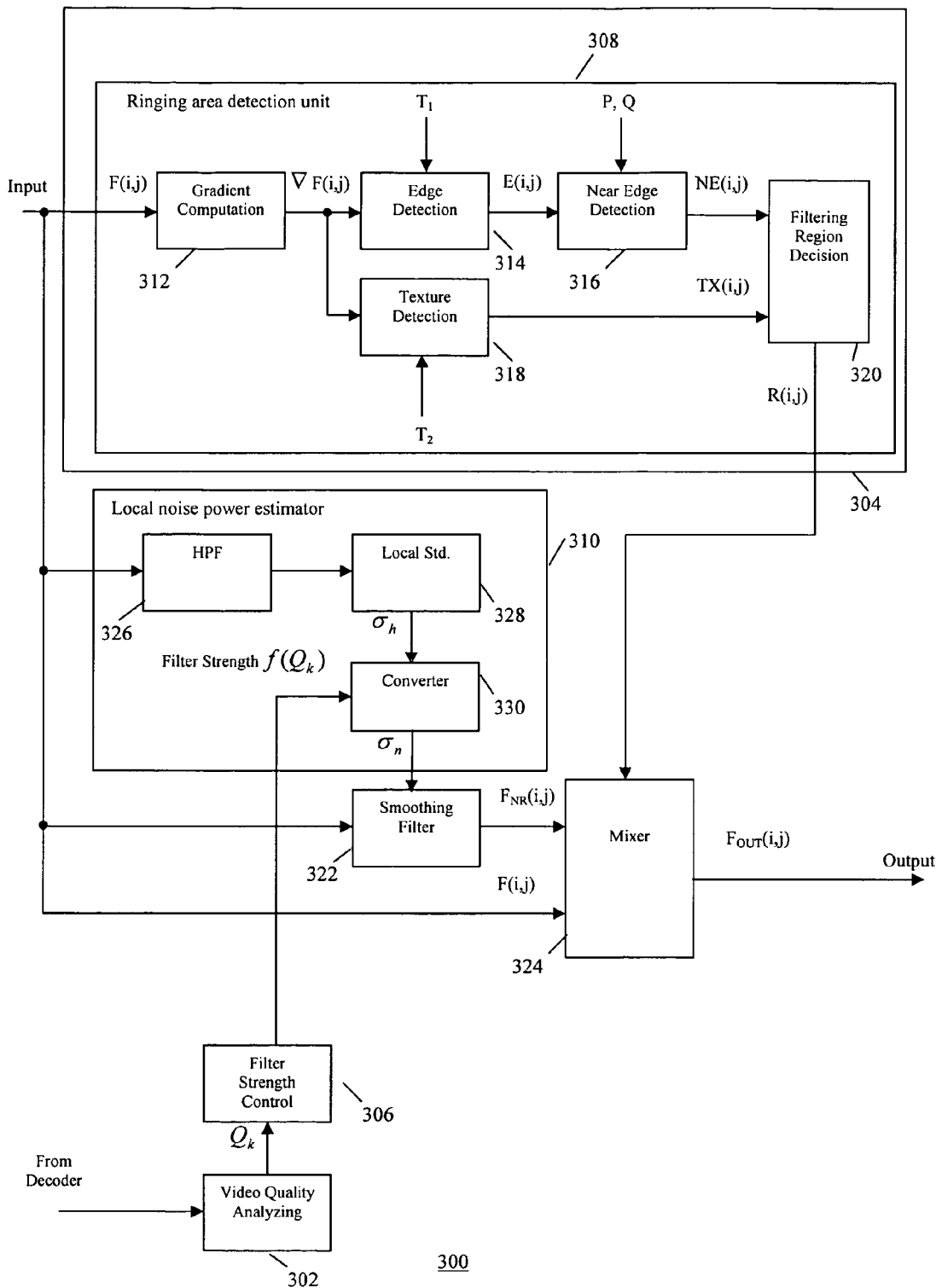
FIG. 3 shows a block diagram of another embodiment of the video quality adaptive coding artifact reduction system according to the present invention, which implements a mosquito noise reduction filter as the artifact reduction filter.

FIG. 3 shows an example block diagram of a video quality adaptive coding artifact reduction system 300 according to another embodiment of the present invention. The system 300 includes a video quality analyzer 302, an artifact reducer 304, and a filter strength controller 306. The artifact reducer 304 implements an artifact reduction filter comprising a mosquito noise reduction filter such as disclosed in commonly assigned patent application Ser. No. 11/121,819, entitled "Method and Apparatus for Reducing Mosquito Noise in Decoded Video Sequence", filed on May 2, 2005 (incorporated herein by reference). As such, the artifact reducer 304 includes a ringing area detection unit 308 which comprises a gradient computation unit 312, an edge detection unit 314, a near edge decision unit 316, a texture detection unit 318, and a filtering region decision unit 320.

The system 300 further comprises a local noise power estimator 310, a smoothing filter 322, and a mixer 324. The local noise power estimator 310 includes a high pass filter (HPF) 326, a local standard deviation calculation unit 328 and a converter 330. The function of the ringing area detection unit 308 is to detect the ringing region (or mosquito noise region) where the smoothing filter needs to be applied.

The system 300 can be applied to both the luminance signal Y and the chrominance signals U and V in a video signal. As such, in general, the input signal is denoted by $F(i,j)$, where i and j are the pixel indices for image row and column respectively. The gradient computation unit 312 computes the gradient of the input signal $F(i,j)$, generating the gradient $|\nabla F(i,j)|$. Those skilled in the art will recognize that different numerical methods can be used to calculate the gradient $|\nabla F(i,j)|$ for a given image.

Based on the gradient $|\nabla F(i,j)|$, edges and texture information are examined. The edge detection unit 314 detects edges by comparing the gradient $|\nabla F(i,j)|$ with a threshold value $T_1$ as:

$$E(i, j) = \begin{cases} 1, & \text{if } |\nabla F(i, j)| > T_1 \\ 0, & \text{else} \end{cases}$$

where 1 denotes edge and 0 denotes non-edge, and $T_1$ is a predetermined constant.

Because the ringing artifact of compressed video arises near edges, it is necessary to detect whether a current pixel is near to edges or not. For this purpose, the near edge detector 316 checks whether there are edges in the neighborhood of the current pixel. Specifically, in a P×Q image pixel block, the edge samples are counted, and if the block contains more than a certain number of edge samples, it is assumed that the current pixel is located near to edges. Let $N_e^{P \times Q}(i,j)$ denote the number of edge samples in the P×Q block around the current pixel $F(i,j)$, then the near edge detection can be as:

$$NE(i, j) = \begin{cases} 1, & \text{if } N_e^{P \times Q}(i, j) > N_T \\ 0, & \text{else} \end{cases},$$

where 1 denotes a near-edge pixel, and 0 denotes a non-near-edge pixel, where $N_T$ is a predetermined constant. The P×Q block around $F(i,j)$ contains P×Q samples. $N_e^{P \times Q}(i,j)$ above represents the number of samples in the P×Q block that are edge points (i.e., the number of samples which are edge points). Then, $NE(i,j)$ indicates whether $F(i,j)$ is located in the near-edge (e.g., NE=1) or not (e.g., NE=0).

For further practical simplicity, according to another aspect of the present invention non-overlapped blocks are used for the near edge detection. Note that the block for computing $N_e^{P \times Q}(i,j)$ assumes overlapped blocks or sliding blocks as pixels are processed. That is, an image frame 400 with multiple P×Q pixel blocks 402 is divided as shown by example in FIG. 4.

To investigate the near-edge detection for the pixel $F(i,j)$ with the non-overlapped P×Q blocks, then an alternative near-edge block detection is utilized based on NEB(I, J) as:

$$NEB(I, J) = \begin{cases} 1, & \text{if } N_e^{P \times Q}(I, J) > N_T \\ 0, & \text{else} \end{cases},$$

where $N_e^{P \times Q}(I,J)$ represents the number of edge sample of the (I,J)th nonoverlapped block in which, $I = \lfloor i/P \rfloor$, $J = \lfloor j/Q \rfloor$, and $\lfloor x \rfloor$ is the floor function which returns to the integer part of the nonnegative number x. Note that NEB(I,J)=1 implies that the (I,J)th block is a near-edge block. Then, the near edge detection for the current pixel $F(i,j)$ is determined as $NE(i,j)=NEB(I,J)$.

NEB(I, J) above indicates whether $F(i,j)$ is located in the near-edge (NEB=1) or not (NEB=0). The difference between NE and NEB is whether an overlapped P×Q block I used (NE) or nonoverlapped P×Q block is used (NEB).

Figure 4:
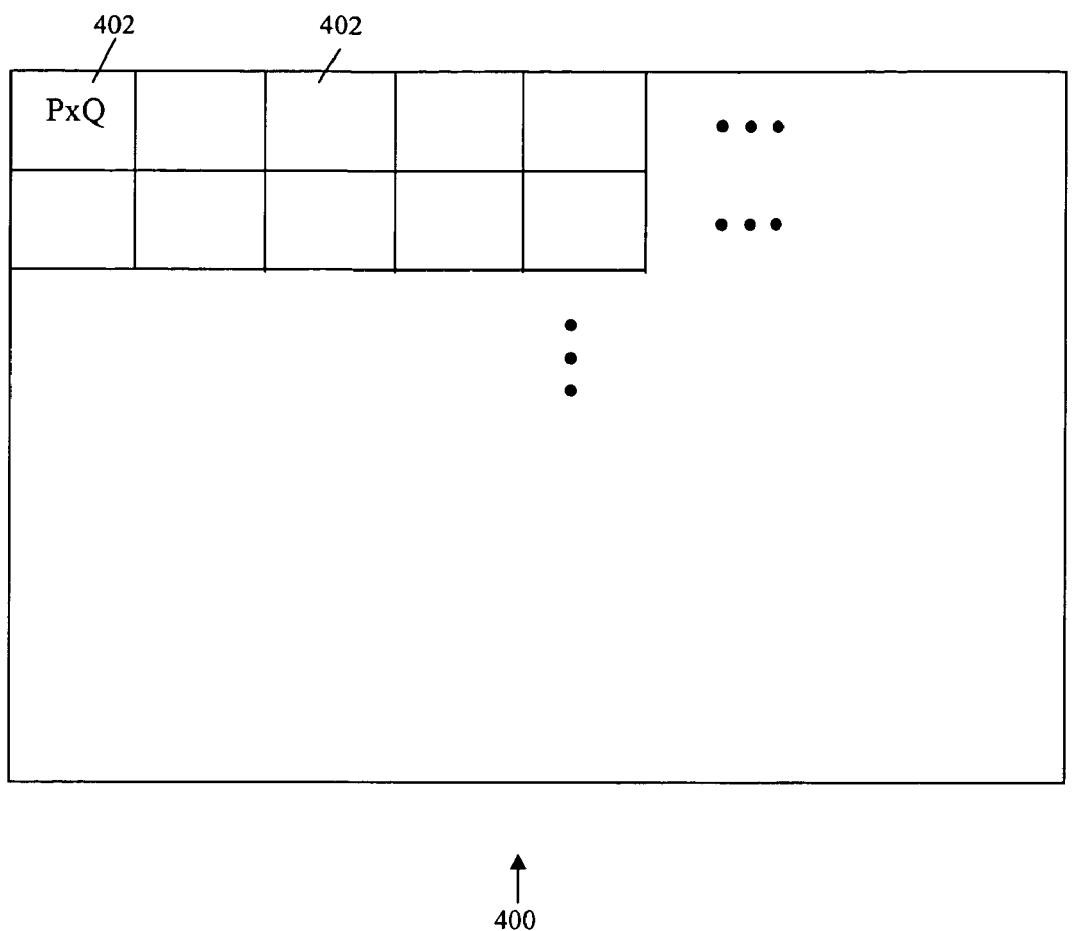
FIG. 4 shows the diagram of an image divided into non-overlapped P×Q blocks.

Note that with the use of non-overlapped blocks, the pixels that belong to the (I,J)th block (i.e., geometrically $F(i,j)$ is located in the (i,j)th nonoverlapped block as shown in FIG. 4) have the same near-edge information. However, using non-overlapped blocks significantly reduces the computation complexity when performing near-edge detection compared to the overlapped block based detection where it is assumed that the near edge detection needs to be done for every pixel position repeatedly.

Referring back to FIG. 3, the texture detection unit 318 detects the texture by comparing the gradient $|\nabla F(i,j)|$ with another threshold value $T_2$ as:

$$TX(i, j) = \begin{cases} 1, & \text{if } |\nabla F(i, j)| > T_2 \\ 0, & \text{else} \end{cases}$$

where 1 denotes texture and 0 denotes non-texture and $T_2$ is a predetermined constant which is less than $T_1$.

The filtering region decision unit 320 generates the filtering region map $R(i,j)$ based on the supplied near-edge map $NE(i,j)$ and the texture map $TX(i,j)$. The near-edge map actually already marks the image region where the mosquito noise occurs. However, the near-edge map may also contain some texture. Filtering texture will cause blurring. Therefore, in order to obtain an accurate filtering region map, texture must be eliminated from the edge-block map. An example logic for removing the texture from the near-edge map is as:

$$R(i, j) = \begin{cases} 1, & \text{if } NE(i, j) = 1 \text{ and } TX(i, j) = 0, \\ 0, & \text{otherwise;} \end{cases}$$

wherein 1 denotes the filtering region where ringing artifact occurs, and 0 denotes the non-filtering region. R(i,j) represents a region for smoothing (or blurring). As such, smoothing is performed in F(i,j) only when F(i,j) is located in the near-edge region (most ringing happens in the near-edge region), and not located in the texture area at the same time. In other words, smoothing is not performed on F(i,j) if it is located in the texture region although it is in the near-edge.

The filtering region map generated by the filtering region decision unit 320 is then supplied to the mixer 324. The function of the local noise power estimator 310 in the system 300 of FIG. 3 is to provide the local filter strength $\sigma_n$ for the smoothing filter 322. The HPF 326 extracts mainly the noise component of the input signal. In a preferred embodiment, the following HPF is:

$$\begin{bmatrix} 1 & -2 & 1 \\ -2 & 4 & -2 \\ 1 & -2 & 1 \end{bmatrix}.$$

Those skilled in the art will recognize that other HPF can also be used. The local standard deviation calculator 328 calculates the local standard deviation $\sigma_h$ of the high-pass filtered signal HF(i,j) over a r×s window as:

$$\sigma_h(i, j) = \frac{1}{r \times s} \sum_{n=-r}^{r} \sum_{m=-s}^{s} |HF(i+m, j+n) - \mu_h(i, j)|,$$

wherein $$\mu_h(i, j) = \frac{1}{r \times s} \sum_{n=-r}^{r} \sum_{m=-s}^{s} HF(i+m, j+n).$$

The calculated local standard deviation $\sigma_h$ is forwarded to the converter 300. The function of the converter 330 is to convert the local ringing noise power $\sigma_h$ to the equivalent local additive Gaussian noise power $\sigma_n$. The converter 330 further utilizes the filter strength provided by the filter strength controller 306 based on the video quality Q-value estimated by the video quality analyzer 302. The video quality analyzer uses the quantizer scale and frame type parameters from a decoder (e.g., decoder 101 in FIG. 1) as input and computes the video quality Q-value $Q_k$ as described above. The filter controller 306 then maps the video quality Q-value $Q_k$ to the filter strength value using a non-increasing function $f(Q_k)$, which has the same characteristics as the function 200 shown in FIG. 2. Based on the provided filter strength $f(Q_k)$, the converter 330 converts the local ringing noise power $\sigma_h$ to the equivalent local additive Gaussian noise power $\sigma_n$ as:

$$\sigma_n = f(Q_k) \sigma_h^{0.45},$$

wherein the local noise power $\sigma_n$ depends on the video quality Q-value $Q_k$. As such, the amount of noise to be removed depends on how good the video quality is. For high quality video, $f(Q_k)$ returns a smaller value, which means less filtering. For low quality video, $f(Q_k)$ returns a larger value, which means more filtering.

The estimated local noise power $\sigma_n$, which essentially determines the amount of noise to be removed for each pixel, is supplied to the smoothing filter 322. The smoothing filter 322 comprises an edge preserving filter which removes noise while retaining image edges. The output $F_{NR}(i,j)$ of the smoothing filter 322 is supplied to the mixer 324. There are many examples of edge preserving filter that can be used in the smoothing filter 322 in the mosquito noise reduction system 300. One example smoothing filter is the weighted sigma filter, which is defined as:

$$F_{NR}(i, j) = \frac{1}{N} \sum_{n=-r}^{r} \sum_{m=-r}^{s} w_{m,n} \cdot F(i+m, j+n);$$

wherein, $$w_{m,n} = \begin{cases} 2 & \text{if } |F(i+m, j+n) - F(i, j)| < C_1 \sigma_n, \\ 1 & \text{if } |F(i+m, j+n) - F(i, j)| < C_2 \sigma_n, \\ 0 & \text{otherwise;} \end{cases}$$

$$N = \sum_{n=-r}^{r} \sum_{m=-r}^{s} w_{m,n};$$

where $C_1$, $C_2$ are predetermined constants with $0 < C_1 < C_2$, and $\sigma_n$ is the local noise power. $F_{NR}(i,j)$ is a weighted average filter output. F(i,j) is the current pixel (when n=m=0), and F(i+m, j+n) (when m, n are not 0) represents the neighbor pixels of F(i,j). Values m and n are mathematical indices to represent the neighbor pixels. Further, $w_{m,n}$ is a weighting factor, and r represents the filter dimension or simply how many samples to average. Note that $F_{NR}(i,j)$ is the average of (2r+1)*(2r+1) samples.

Another example smoothing filter is the minimal mean square error (MMSE) filter, defined as:

$$F_{NR}(i, j) = \mu(i, j) + \frac{\max(\sigma^2(i, j) - \sigma_n^2, 0)}{\max(\sigma^2(i, j) - \sigma_n^2, 0) + \sigma_n^2} \cdot [F(i, j) - \mu(i, j)],$$

wherein $\sigma_n$ is the local noise power, and, $\mu(i,j)$ and $\sigma(i,j)$ are the local mean and local standard deviation computed over a r×r window as:

$$\mu(i, j) = \frac{1}{r^2} \sum_{n=-r}^{r} \sum_{m=-r}^{r} F(i+m, j+n),$$

$$\sigma(i, j) = \frac{1}{r^2} \sum_{n=-r}^{r} \sum_{m=-r}^{r} |F(i+m, j+n) - \mu(i, j)|.$$

The mixer 324 in the system 300 of FIG. 3 selects either the output $F_{NR}(i,j)$ of the smoothing filter 322 or the original input signal F(i,j) as the final output based on the filtering region map, which separates the image into two regions: filtering region and non-filtering region. In the filtering region, the mixer 324 selects the output $F_{NR}(i,j)$ of the smoothing filter 322 as the final output. In the non-filtering region, the mixer 324 selects the original input signal F(i,j) as the final output. Preferably, soft switching is used in the mixer 324 to switch between the filtered signal $F_{NR}(i,j)$ and the non-filtered signal F(i,j).

As known to those skilled in the art, there can be many different ways of analyzing the video quality of a compressed video by investigating quantization scales. The present invention is not limited to particular ways of obtaining such information. The present invention provides a method of adaptively adjusting the strength of coding artifact reduction filters with the video quality analyzer or the degree of compression of a video.

The present invention has been described in considerable detail with reference to certain preferred versions thereof; however, other versions are possible. Therefore, the spirit and scope of the appended claims should not be limited to the description of the preferred versions contained herein.

What is claimed is:

1. A system for reducing coding artifact in a decoded video sequence, comprising:
   a video quality analyzing unit that estimates video quality level of an input video based on quantizer scales and frame type information;
   an artifact reduction unit responsive to filtering strength control signals, wherein the artifact reduction unit filters the input video to remove coding artifacts based on the filtering strength control signals; and
   a filter strength control unit that generates the filtering strength control signals based on the video quality level estimated by the video quality analyzing unit, wherein the filter strength control unit controls the filtering strength of the artifact reduction filter in filtering the input video to remove the coding artifacts.

2. The system of claim 1 wherein the filter strength control unit controls the filter strength of the artifact reducing unit based on the video quality estimated by the video quality analyzer, such that for low quality input video, the filter strength controller increases the artifact reduction filter strength to more efficiently reduce the artifact, and for high quality input video, the filter strength controller decreases the artifact reduction filter strength to avoid blurring image detail.

3. The system of claim 1 wherein the video quality analyzing unit estimates the video quality level of each frame of the input video by:
   computing the video frame average quantizer scales to obtain a frame image quality estimate;
   applying weighting factors to the frame image quality estimate based on the frame type; and
   averaging the weighted frame image quality estimates of the neighboring frames centered at a current frame to obtain a temporal consistent video quality estimate for the current frame.

4. The system of claim 3 wherein the video quality analyzing unit estimates the video quality level of each frame of the input video by:
   computing the average of quantizer scales of macroblocks in each input video frame to obtain a frame average quality value;
   multiplying the frame average quality value by a weight based on frame type, to obtain a weighted frame average quality value;
   low-pass filtering the weighted frame average quality value to obtain a temporal average quality value; and
   generating the reciprocal of the temporal average quality value to estimate the video quality value of the frame.

5. The system of claim 1 wherein the artifact reduction unit comprises a coding artifact reduction filter that removes certain types of coding artifacts.

6. The system of claim 5 wherein the coding artifact reduction filter comprises a deblocking filter.

7. The system of claim 5 wherein the coding artifact reduction filter comprises a deringing filter.

8. The system of claim 5 wherein the coding artifact reduction filter comprises a mosquito noise reduction filter.

9. The system of claim 1 wherein the filter strength control unit maps the video quality estimated by the video quality analyzing unit into the filter strength of the artifact reduction unit using a non-increasing function.

10. A coding artifact reduction system for reducing mosquito noise in a decoded input video image sequence, comprising:
    a video quality analyzing unit that estimates the video quality level of the input video;
    a filter strength control unit that generates filtering strength control signals based on the video quality level estimated by the video quality analyzing unit;
    a local noise power estimator that based on the filtering strength control signals from the filter strength control unit, generates a local filter strength signal for controlling a smoothing filter;
    a smoothing filter that removes unwanted noise from the input video image based on the local filter strength signal from the local noise power estimator, to generate a filtered signal;
    a ringing area detection unit that detects a mosquito noise image region in the input video image and generates a filtering region map;
    a mixer that selects either the filtered signal output of the smoothing filter or the original input video image as the final output based on the filtering region map, thereby reducing mosquito noise in the decoded input video image sequence.

11. The system of claim 10 wherein a local noise power estimator estimates the local noise power which essentially determines the amount of noise to be removed from each input image pixel by the smoothing filter.

12. The system of claim 10 wherein the smoothing filter comprises an edge preserving filter which removes noise while retaining image edges.

13. The system of claim 10 wherein the local noise power estimator estimates the equivalent local additive Gaussian noise power to provide the local filter strength for controlling the smoothing filter.

14. The system of claim 10 wherein the local noise power estimator includes a converter responsive to the estimated local filter strength to convert the local ringing noise power to the equivalent local additive Gaussian noise power, based on the filter strength provided by the filter strength control unit.

15. The system of claim 14 wherein the local noise power is dependent on the video quality, such that the amount of noise removed by the smoothing filter depends on the video quality of the input video image as estimated by the video quality analyzing unit.

16. The system of claim 10 wherein the ringing area detection unit comprises:
    an edge detector that detects an edge region in the video image and generates an edge map;
    a near-edge detector that uses the edge map to detect a near-edge region and generates a near-edge map;
    a texture detector that detects a texture region in the video image and generates a texture map; and
    a filtering region decision unit that uses the near-edge map and the texture map to generate the filtering region map.

17. The system of claim 16 further comprising a gradient computation unit that calculates the gradient of the video image, wherein the edge detector detects the edge region by comparing the magnitude of the gradient of each pixel in the video image with a threshold value, and marks the pixel as an edge pixel if the pixel gradient is greater than the threshold value.

18. The system of claim 16 wherein said near-edge detector detects a near-edge region by: counting the edge pixels within a block in an input video frame containing a current pixel, and marking the current pixel as a near-edge pixel if the number of edge pixels within the block exceeds a certain threshold value.

19. The system of claim 18 wherein blocks used for near-edge detection can be either overlapped or non-overlapped blocks that cover the whole image frame.

20. The system of claim 16 further comprising a gradient computation unit that calculates the gradient of the video image, wherein the texture detector detects the texture region by comparing the magnitude of the gradient of each pixel in the video image with a threshold value, and marks the pixel as a texture pixel if the pixel gradient is greater than the threshold value.

21. The system of claim 16 wherein said filtering region decision unit generates the filtering region map by excluding the texture region from the near-edge region.

22. The system of claim 10 wherein said local noise power estimator comprises:
  a high-pass filter that extracts the noise component of the input video signal to generate a high-pass filtered signal;
  a local standard deviation calculator that calculates the local standard deviation $\sigma_h$ of the high-pass filtered signal; and
  a converter that converts the local standard deviation $\sigma_h$ of the high-pass filtered signal into a equivalent local additive Gaussian noise power $\sigma_n$ on the filtering strength control signals from the filter strength control unit.

23. The system of claim 22 wherein said local standard deviation calculator calculates the local standard deviation $\sigma_h$ of the high-pass filtered signal HF(i, j) over a r×s window as:

$$\sigma_h(i, j) = \frac{1}{r \times s} \sum_{n=-r}^{r} \sum_{m=-s}^{s} |HF(i+m, j+n) - \mu_h(i, j)|$$

where $$\mu_h(i, j) = \frac{1}{r \times s} \sum_{n=-r}^{r} \sum_{m=-s}^{s} HF(i+m, j+n).$$

24. The system of claim 22 wherein said converter converts the local standard deviation $\sigma_h$ of the high-pass filtered signal into a equivalent local additive Gaussian noise power $\sigma_n$ as:

$$\sigma_n = f(Q_k)\sigma_h^{0.45},$$

where $Q_k$ is a video quality value estimated by the video quality analyzing unit, and $f(Q_k)$ is a non-increasing function used by the filter strength control unit to map the video quality value to the local filter strength signal that controls the overall smoothing level of the smoothing filter.

25. The system of claim 24, wherein the smoothing filter comprises a weighted sigma filter that filters the input signal as:

$$F_{NR}(i, j) = \frac{1}{N} \sum_{n=-r}^{r} \sum_{m=-r}^{r} w_{m,n} \cdot F(i+m, j+n),$$

wherein $F_{NR}(i, j)$ is the filtered signal;

$$w_{m,n} = \begin{cases} 2 & \text{if } |F(i+m, j+n) - F(i, j)| < C_1\sigma_n, \\ 1 & \text{if } |F(i+m, j+n) - F(i, j)| < C_2\sigma_n, \\ 0 & \text{otherwise;} \end{cases}$$

$$N = \sum_{n=-r}^{r} \sum_{m=-r}^{r} w_{m,n},$$

and $C_1$, $C_2$ are predetermined constants with $0 < C_1 < C_2$, and $\sigma_n$ is the local noise power.

26. The system of claim 25 wherein the noise smoothing filter comprises a minimal mean square error filter that filters the signal as:

$$F_{NR}(i, j) = \mu(i, j) + \frac{\max(\sigma^2(i, j) - \sigma_n^2, 0)}{\max(\sigma^2(i, j) - \sigma_n^2, 0) + \sigma_n^2} \cdot [F(i, j) - \mu(i, j)],$$

wherein $F_{NR}(i, j)$ is the filtered signal:

$$\mu(i, j) = \frac{1}{r^2} \sum_{n=-r}^{r} \sum_{m=-r}^{r} F(i+m, j+n),$$

$$\sigma(i, j) = \frac{1}{r^2} \sum_{n=-r}^{r} \sum_{m=-r}^{r} |F(i+m, j+n) - \mu(i, j)|,$$

and $\sigma_n$ is the local noise power.

27. The system of claim 10 wherein said mixer selects the result of the smoothing filter as the final output in the filtering region, and selects the original input signal as the final output in the non-filtering region.

28. A system for reducing coding artifact in a decoded video sequence, comprising:
  a video quality analyzing unit that estimates video quality level of an input video;
  an artifact reduction unit responsive to filtering strength control signals, wherein the artifact reduction unit filters the input video to remove coding artifacts based on the filtering strength control signals; and
  a filter strength control unit that generates the filtering strength control signals based on the video quality level estimated by the video quality analyzing unit, wherein the filter strength control unit controls the filtering strength of the artifact reduction filter in filtering the input video to remove the coding artifacts based on the video quality estimated by the video quality analyzer, such that for low quality input video, the filter strength controller increases the artifact reduction filter strength to more efficiently reduce the artifact, and for high quality input video, the filter strength controller decreases the artifact reduction filter strength to avoid blurring image detail.

29. A system for reducing coding artifact in a decoded video sequence, comprising:
  a video quality analyzing unit that estimates video quality level of an input video by:
    computing the video frame average quantizer scales to obtain a frame image quality estimate;
    applying weighting factors to the frame image quality estimate based on the frame type; and averaging the weighted frame image quality estimates of the neighboring frames centered at a current frame to obtain a temporal consistent video quality estimate for the current frame;

an artifact reduction unit responsive to filtering strength control signals, wherein the artifact reduction unit filters the input video to remove coding artifacts based on the filtering strength control signals; and a filter strength control unit that generates the filtering strength control signals based on the video quality level estimated by the video quality analyzing unit, wherein the filter strength control unit controls the filtering strength of the artifact reduction filter in filtering the input video to remove the coding artifacts.

* * * * *